June 7, 1966
E. R. BERLINER
3,254,671
PUSH CONTROL VALVE FOR INSTANT DEFLATION OF BLOOD
PRESSURE INSTRUMENTS
Filed Aug. 24, 1964
5 Sheets-Sheet 1
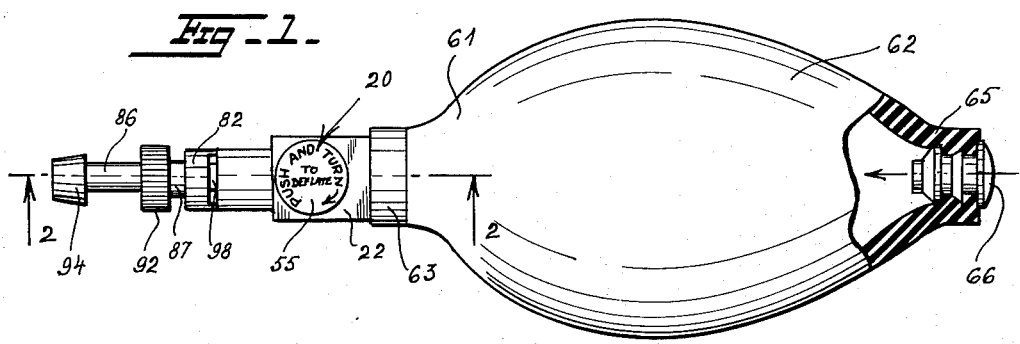
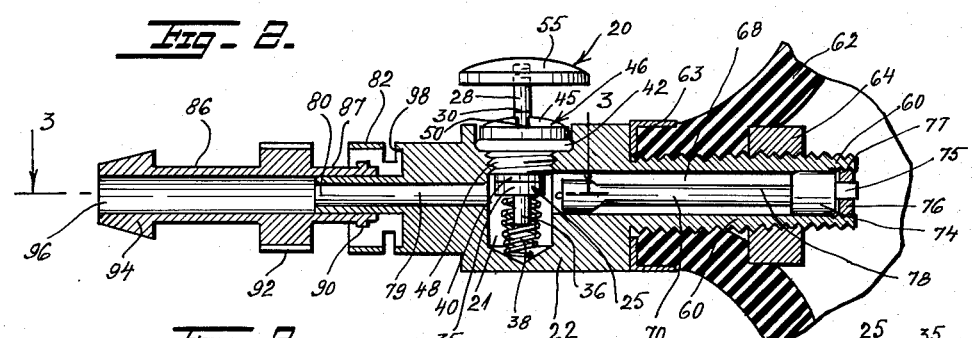
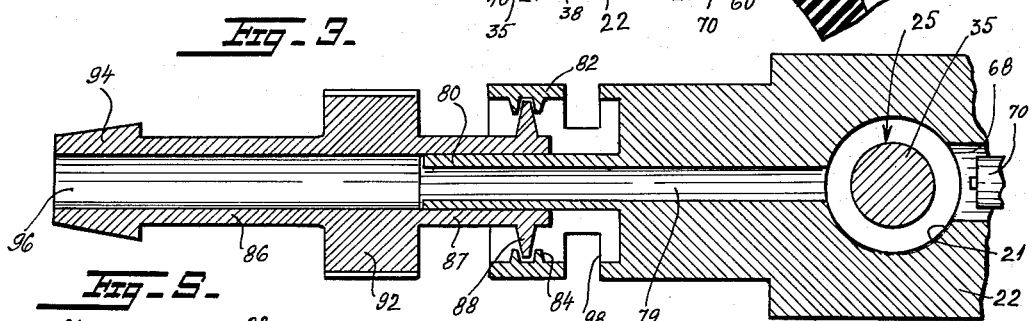
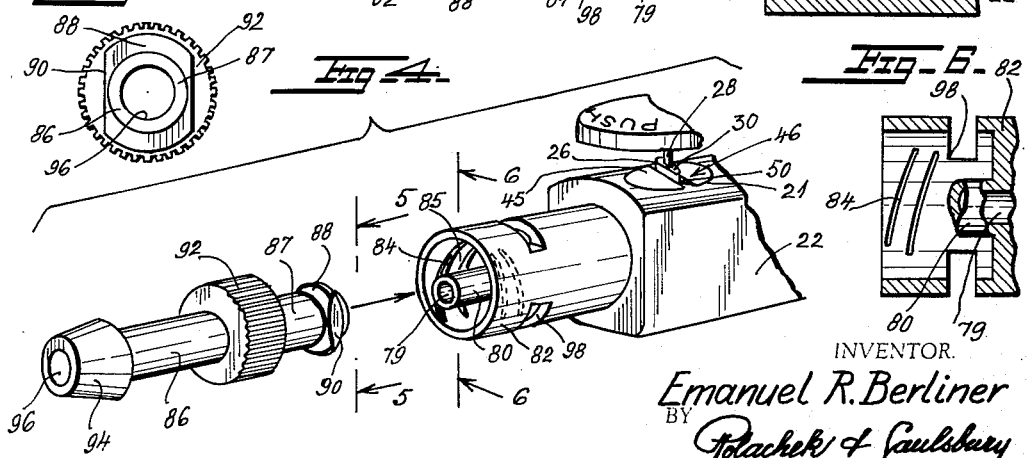
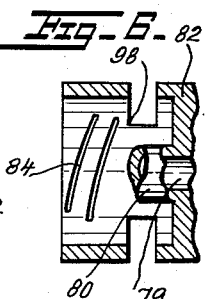
INVENTOR.
Emanuel R. Berliner
BY
Polachek & Saulsbury
ATTORNEYS.

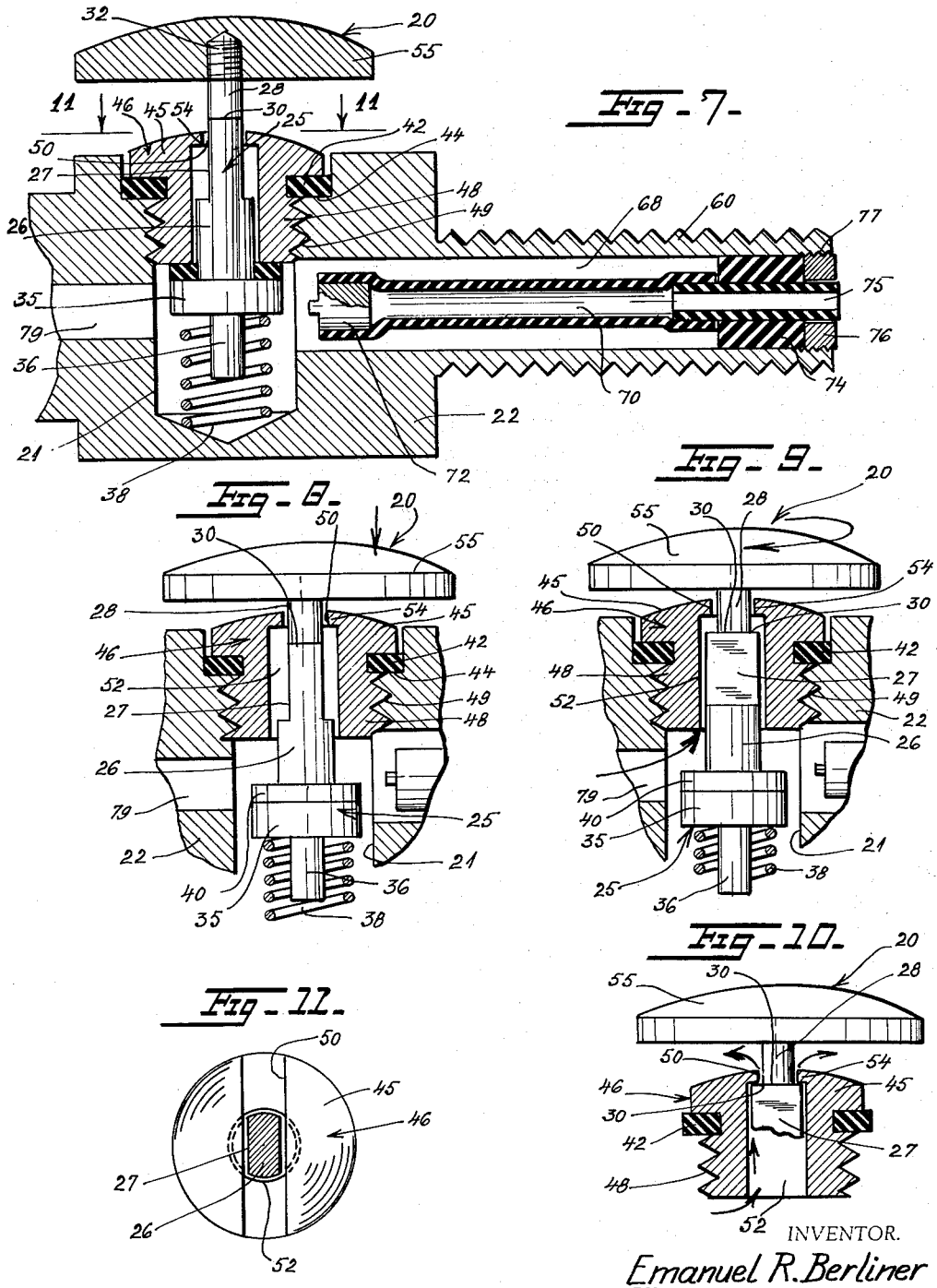

June 7, 1966 E. R. BERLINER 3,254,671
PUSH CONTROL VALVE FOR INSTANT DEFLATION OF BLOOD
PRESSURE INSTRUMENTS
Filed Aug. 24, 1964 5 Sheets-Sheet 3
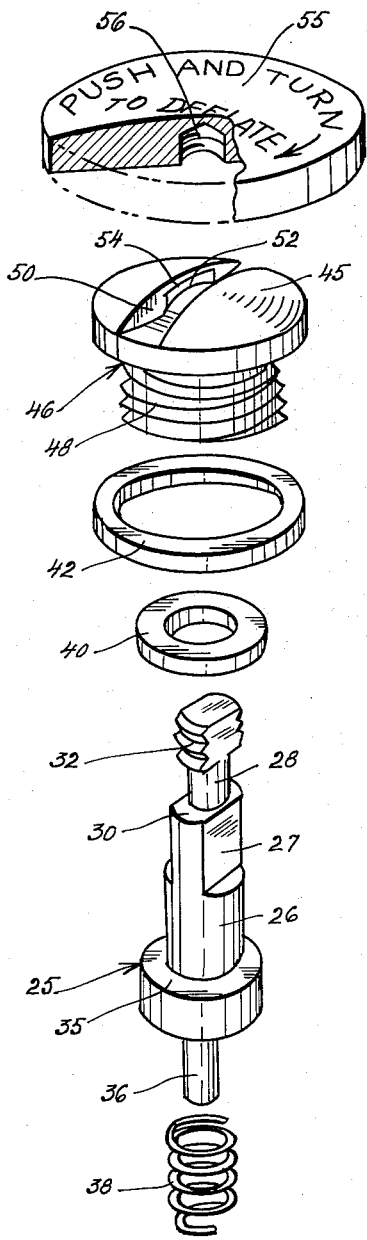
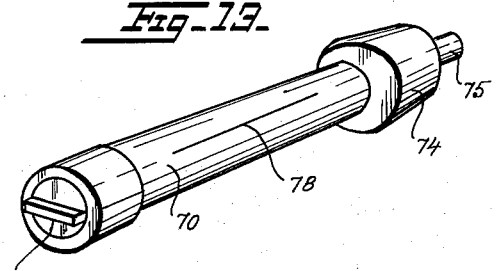
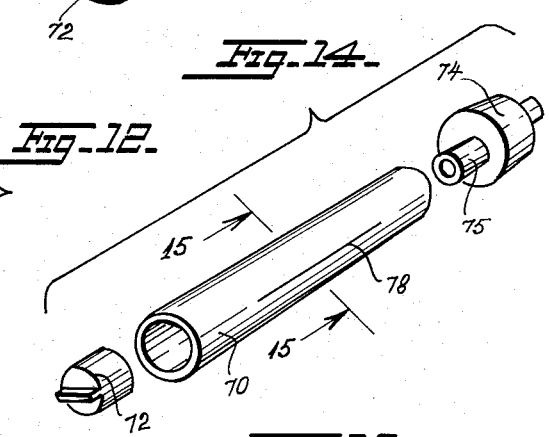
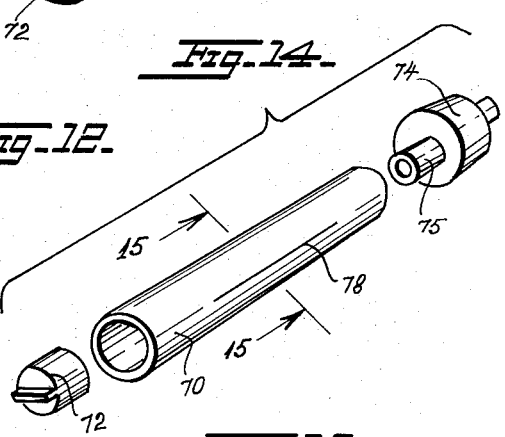
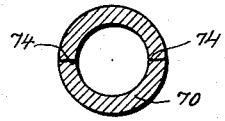
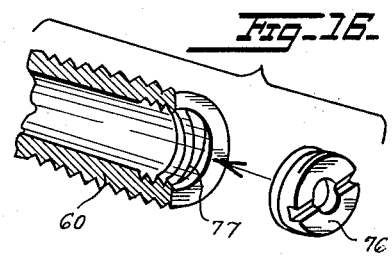
INVENTOR.
Emanuel R. Berliner
BY
Polachek & Saulsbury
ATTORNEYS.

June 7, 1966  E. R. BERLINER  3,254,671
PUSH CONTROL VALVE FOR INSTANT DEFLATION OF BLOOD
PRESSURE INSTRUMENTS
Filed Aug. 24, 1964  5 Sheets-Sheet 4
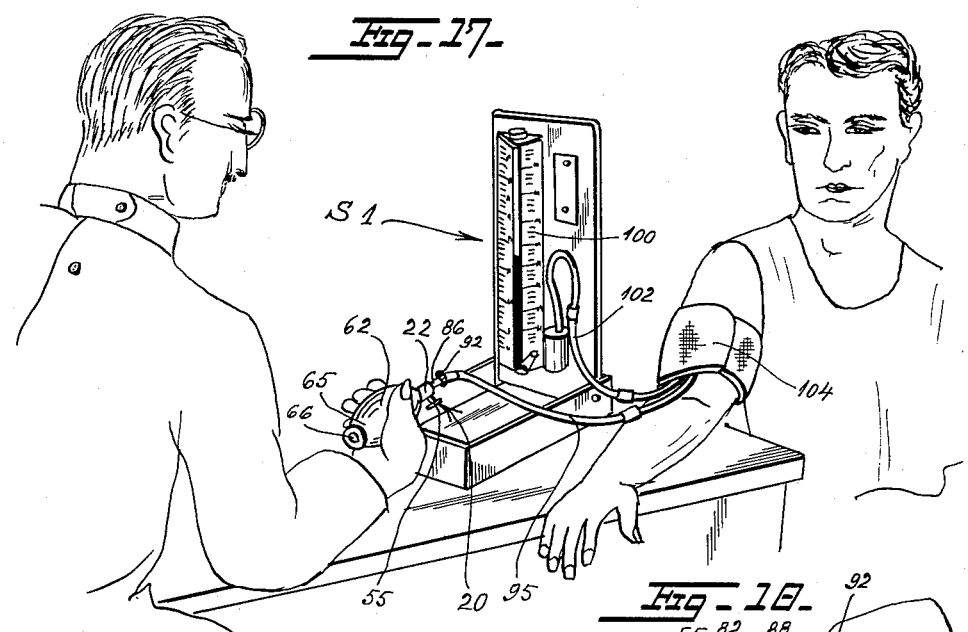
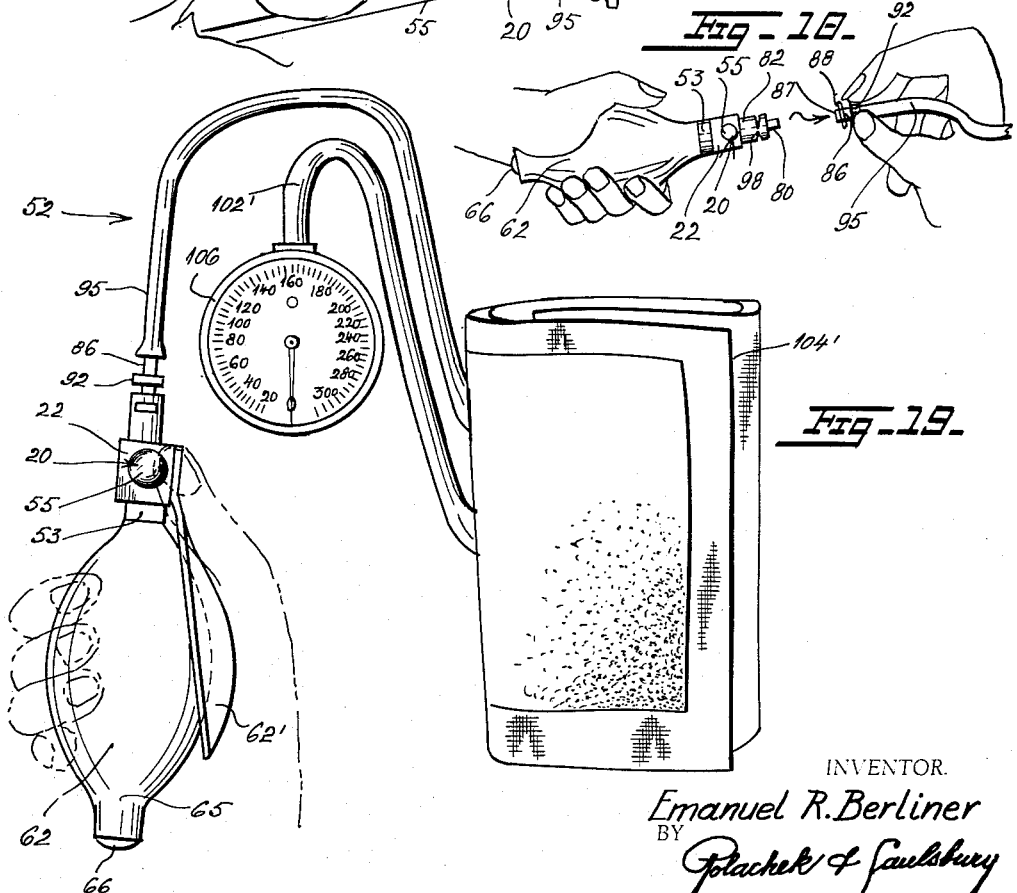
INVENTOR.
Emanuel R. Berliner
BY
Polachek & Saulsbury
ATTORNEYS.

June 7, 1966  E. R. BERLINER  3,254,671
PUSH CONTROL VALVE FOR INSTANT DEFLATION OF BLOOD
PRESSURE INSTRUMENTS
Filed Aug. 24, 1964  5 Sheets-Sheet 5
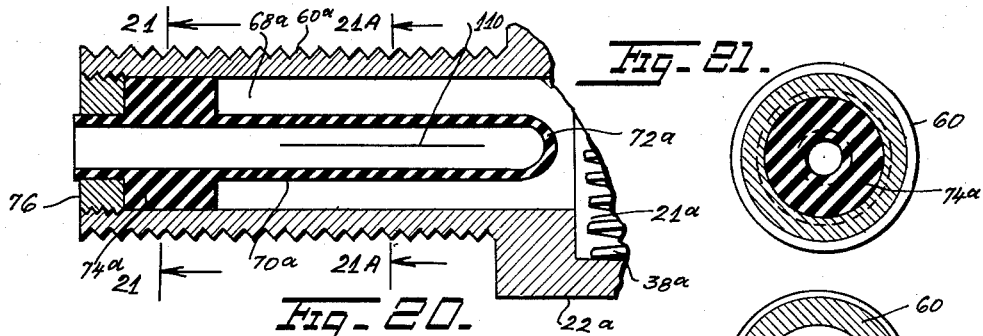
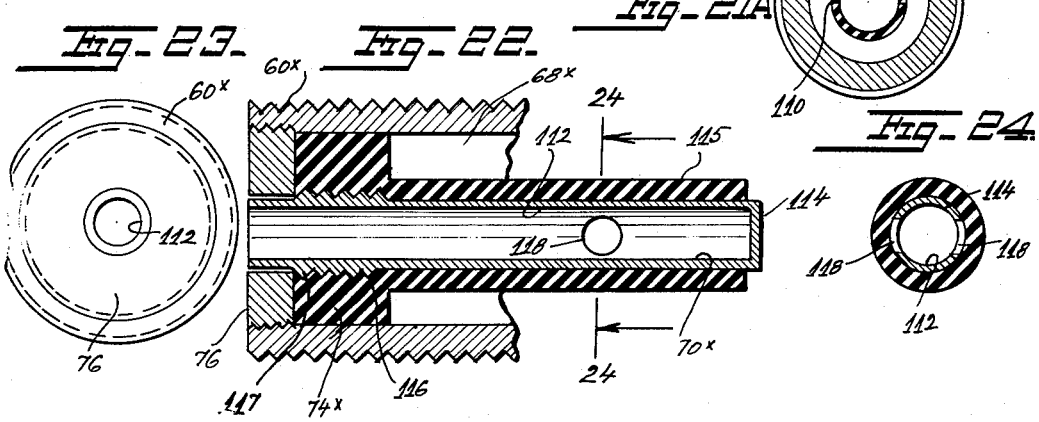
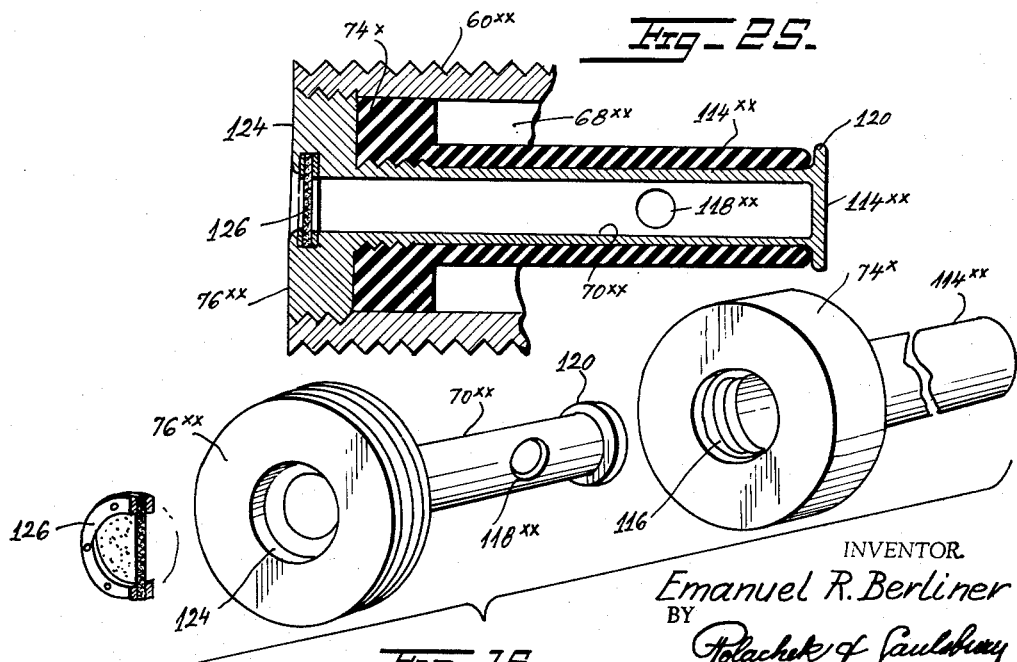
INVENTOR.
Emanuel R. Berliner
BY
Polachek & Saulsbury
ATTORNEYS.

3,254,671
PUSH CONTROL VALVE FOR INSTANT DEFLATION OF BLOOD PRESSURE INSTRUMENTS
Emanuel R. Berliner, 50 Brook Road,
Valley Stream, N.Y.
Filed Aug. 24, 1964, Ser. No. 391,595
10 Claims. (Cl. 137—565)

This invention relates to new and improved valve controls for the bulbs used for applying pressure in cuff-type sphygmomanometers.

A principal object of the invention is to provide a sphygmomanometer with a push-button valve assembly arranged for selectively discharging air at a controllable slow rate or at a rapid rate.

Another object is to provide the push-button valve assembly for a sphygmomanometer, with means for retaining the push button in a depressed position while air is discharged at the rapid rate.

A further object is to provide a sphygmomanometer bulb with an improved one-way valve operative while the cuff of the sphygmomanometer is being inflated to maintain the cuff in inflated condition.

Another object is to provide a sphygmomanometer bulb with a quick-release fitting connection between the bulb and a tube conducting air to the cuff for effecting discharge of air from the cuff at a maximum rate.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a sphygmomanometer bulb, air release valve assembly, and fitting, embodying the invention, part of the bulb being broken away.

FIG. 2 is an enlarged fragmentary central section view taken on line 2—2 of FIG. 1.

FIG. 3 is a further enlarged fragmentary central sectional view taken on line 3—3 of FIG. 2.

FIG. 4 is an exploded perspective view of parts of the valve assembly and fitting of FIGS. 1–3.

FIG. 5 is an enlarged end view of the fitting taken on line 5—5 of FIG. 4.

FIG. 6 is an enlarged fragmentary central sectional view taken on line 6—6 of FIG. 4.

FIG. 7 is a central view similar to parts of FIG. 2, but on a larger scale to show interior constructional features of the push-button valve assembly and one-way valve.

FIGS. 8, 9 and 10 are views similar to portions of FIG. 7, showing the push-button valve in different positions.

FIG. 11 is a fragmentary sectional view taken on line 11—11 of FIG. 7.

FIG. 12 is an exploded perspective view of parts of the push-button valve assembly.

FIG. 13 is a perspective view of the one-way valve.

FIG. 14 is an exploded perspective view of parts of the one-way valve.

FIG. 15 is an enlarged cross-sectional view taken on line 15—15 of FIG. 14.

FIG. 16 is an exploded perspective view partially in section of parts of the one-way valve.

FIG. 17 is a perspective view on a reduced scale of a sphygmomanometer embodying the invention, shown with a mercury pressure gauge.

FIG. 18 is a side view of a bulb and air conduction tube detached from each other.

FIG. 19 is a side view of another sphygmomanometer embodying the invention, shown with a dial pressure gauge.

FIG. 20 is a fragmentary sectional view similar to FIG. 7 of a still further modified form of valve mechanism.

FIG. 21 is a cross-sectional view taken on the line 21—21 of FIG. 20.

FIG. 21A is a cross-sectional view taken on the line 21A—21A of FIG. 20.

FIG. 22 is a view similar to FIG. 20 of yet another modified form of valve mechanism.

FIG. 23 is an end view looking from the left of FIG. 22.

FIG. 24 is a cross-sectional view taken on the line 24—24 of FIG. 20.

FIG. 25 is a view similar to FIG. 20 of still another modified form of valve mechanism.

FIG. 26 is a spread perspective view of some of the valve parts of FIG. 25, parts being shown broken away and in section.

Referring first to FIGS. 1–12, there is shown a push-button valve assembly 20 according to the invention. The valve assembly is mounted in a transverse bore 21 of an elongated coupling member 22. The valve, as shown to best advantage in FIGS. 2–4 and 7–12, has a stem 25. This stem has a cylindrical body 26 provided with two intermediate flat parallel lands 27 at its upper end; see FIG. 12. A cylindrical neck 28 of reduced diameter extends axially upward from stem body 26 to define flat shoulders 30 at the base of the neck or top of the stem body 26. The stem 25 has a threaded head 32. An annular, radially extending flange 35 is formed at the lower end of the stem body and a peg 36 extends axially downward from the bottom end of body 26. A coil spring 38 fits on the peg 36, and bears on the bottom of bore 21 in coupling 22; see FIG. 2.

A resilient ring washer 40 having the same internal diameter as the external diameter of the lower part of body 26 fits on this body and seats on flange 35. Another resilient ring washer 42 seats on a shoulder 44 formed near the upper end of bore 21; see FIGS. 7–9. A valve screw 46 has a threaded shank portion 48 which screws into an internally threaded portion 49 in bore 21 just below shoulder 44. The screw has a head 45 which bears on washer 42. The head has a transverse slot 50 at its top and a central axial passage 52 communicating with slot 50. The passage 52 has a larger diameter than the width of slot 50, so that a pair of opposing shoulders 54 are provided at the top of the screw overhanging and partially obstructing the end of passage 52 at slot 50. The stem extends through the passage 52 and the upper narrow end of the stem extends through the passage 52 and the upper narrow end of the stem extends through the slot. In the position of the stem in FIG. 7, the lands 27 extend through slot 50. These lands are then disposed parallel to and are slightly spaced from the inner edges respectively of screw shoulders 54. A cap 55 is provided with an axial threaded bore 56 in which is seated the threaded head of the stem. The cap overhangs the top of screw 46. The stem 25 may be also bonded or riveted to the cap 55.

It will be noted that the valve assembly is shown in a closed position in FIGS. 2 and 7. Air under pressure in bore 21 cannot pass the airtight seal provided by washer 40 abutting the bottom end of screw 46. Lands 27 facing shoulders 54 of the screw prevent rotation of the stem 25 as shown in FIG. 11.

Suppose the stem 25 is slightly depressed so that lands 27 still face shoulders 54 but washer 40 moves slightly away from the bottom end of screw 46. A very restricted passage for air will now be opened between lands 27 and shoulders 54 so that air is slowly released through the valve assembly. This is a desirable operating condition for the valve assembly in the sphygmomanometer and is required during normal operation thereof. Spring 38 will be slightly compressed.

If it is now desired to release air at a faster rate, the stem may be further depressed to the position shown in FIG. 8 where neck 28 is located between shoulders 54. The passage for air will be enlarged from that shown in FIG. 11 since air can now pass upwardly out of passage 52 all around neck 28. Spring 38 is now further compressed.

The operator can secure the stem in the depressed position with air being rapidly released, by rotating the valve stem 90° from the position of FIG. 8 to the position of FIG. 9, while the valve stem is held depressed. This movement places the stem shoulders 30 under the screw shoulders 54. If the valve stem is then released, the upward axial movement of the stem caused by expanding spring 38 will result in engagement of shoulders 30 at the undersides of shoulders 54. The larger air passage around neck 28 will be maintained and the air will pass out of the valve assembly without further manipulation required by the operator. This leaves the operator's hands free for other work.

The valve assembly 20 is seated in the coupling member 22 which has an externally threaded tubular extension 60 axially disposed in one end 61 of flexible bulb 62. A reinforcement ring 63 is fitted on the end of the bulb and a nut 64 is engaged on the extension 60 in the bulb; see FIG. 2. At its other end 65 the bulb has a one-way inlet valve 66 which admits air into the bulb. The air is forced out of end 61 of the bulb when the bulb is compressed. The air passes through axial passage 68 in tubular extension 60. Seated inside the passage 68 is a flexible, rubber tube 70 which serves as a one-way valve; see FIGS. 2, 7 and 13–16.

Tube 70 has a plug 72 in one end adjacent to the end of passage 68 where it joins bore 21. The other end of the tube is open and engaged on a tube 75 secured in an annular plug 74, inside passage 68 near the rear end of tubular extension 60. A threaded screw ring 76 is screwed in end 77 of extension 60 and abuts plug 74 in passage 68, while tube 75 extends axially through the plug and is open to the interior of bulb 62. A pair of axially extending slits 78 are formed in the tube in diametrically opposed positions; see FIGS. 13–15. When air enters the tube 70 from bulb 62 as the bulb is compressed, these slits open to permit the air to pass therethrough to bore 21 and connecting passage 79 axially aligned with passage 68. When the bulb is released, back pressure of air from passage 79 enters passage 68 and collapses the walls of tube 70 so that the air cannot reenter the bulb. The air pressure is thus maintained at the closed valve assembly 20 for release when the valve assembly 20 is operated as described above.

Coupling 22 is formed with an extension tube 80 through which passage 79 extends axially. Around the end of tube 80 where it joins the body of coupling 22 is a cylindrical sleeve extension 82 of the coupling, best shown in FIGS. 1–4 and 6. On the inside of the sleeve extension are arcuate ridges 84 defining threads. Tubular fitting 86 has an end 87 which slides axially on the extension tube 80 in an airtight frictional fit. An annular flange 88 which is tapered in cross section is formed on the end 87 of the fitting 86. This flange has lateral flat lands 90 formed therein in diametrically opposed positions. These lands, shown in FIGS. 2, 4 and 5, permit the fitting end 87 to be inserted in sleeve 82 past threads 84. Then the tapered ends of flange 88 can be engaged with the threads 84 by twisting the fitting a quarter turn; i.e. 90°; see FIG. 3.

A knurled, annular flange 92 is provided on the fitting 86 to facilitate grasping and turning the fitting. A conical tip 94 is formed on the front free end of the fitting for engaging an air conduction tube 95 as shown in FIGS. 17, 18 and 19. The fitting has an axial passage 96 which aligns axially with passage 79 in coupling 22 and extension tube 80. Slots 98 are provided in the sleeve extension 82 to admit air into the sleeve extension and to release air therefrom as the fitting is removed from or attached to the coupling. The slots also facilitate cleaning the coupling sleeve 82 and tube 80.

It will be apparent that separation of fitting 86 from the coupling 22 will enable a very rapid release of air from the inflated cuff of the sphygmomanometer when the fitting is detached. Under certain conditions the release of air through valve assembly 20 at the most rapid rate possible will not be fast enough, whereupon the operator can quickly detach the fitting 86 to effect the required fast release of air.

FIG. 17 shows a sphygmomanometer S1 having a mercury type scale 100. A tube 102 is connected between inflatable cuff 104 and the scale 100 for measuring air pressure. Tube 95 is connected to the fitting 86 which is attached to coupling 22 provided with a valve assembly 20 according to the invention.

FIG. 19 shows a sphygmomanometer S2 having a dial type of pressure gauge 106 to which tube 102' is connected from cuff 104' for measuring air pressure in the cuff when inflated. Tube 95 is connected from fitting 86 to the cuff 104' for passing air directly from the bulb 62 to the cuff via coupling 22. Coupling 22 is provided with a valve assembly 20 as described above. Lever 62' facilitates compression of bulb 62.

In the modified form of valve mechanism shown in FIGS. 22 to 24, inclusive, a metal tube 112 having a closed end 114 is positioned centrally of the passage 68x in extension 60x. A rubber tube or sleeve 115 is formed integrally with annular plug 74x and is sleeved around the tube 112. The plug 74x is formed with internal screw threads 116 coacting with external screw threads 117 on the tube 112. Tube 112 is formed with opposed holes 118 and when the bulb is squeezed air passes through tube 112 out through the holes 118 forcing the rubber tube 115 off of the tube 112 permitting the air to escape along the tube 112 into the passage 68x to the bore 21.

The modified valve mechanism shown in FIGS. 20 to 21A, inclusive, differs from the form of valve mechanism shown in FIG. 7 in that the annular plug 74a, the tube 75a and the adjacent end of rubber tube 70a are formed integrally instead of separately and the other end of the rubber tube 70a is closed as indicated at 72a instead of being plugged. Furthermore, the body of the rubber tube 70a is formed with opposed elongated slits 110, 110.

In use, the air blown from the bulb passes through the tube 75a, tube 70a out through the slits 110, 110, when the bulb is squeezed, to the passage 68a in extension 60a to the bore 21a.

The modified form of valve mechanism shown in FIGS. 25 and 26 is similar to the valve mechanism shown in FIGS. 22 to 24, inclusive, except that an annular flange 120 is formed on the closed end 114xx of the tube 70xx and the threaded screw ring 76xx is formed integrally with the tube 70xx and is formed with an annular groove 124 in its outer face. A framed perforated disc 126 is supported in the groove 124 and is disposed across the aligned passages in the ring and tube 70xx.

In use, when the bulb is squeezed, air is forced through the disc 126 and passages in the ring and tube 70xx, out through the holes 118xx in the tube, forcing the sleeve 114xx off of the tube 70xx, permitting air to escape to the passage 68xx to the bore 21. The sphygmomanometers are provided with facilities for slow, controllable release of air, rapid, and very rapid release of air. The rapid release of air through the valve assembly is maintainable under manual control. Alternatively, the rapid release of air can be maintained by setting the valve assembly to fully depressed and locked position.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A valve assembly for a sphygmomanometer, comprising an elongated coupling having an axial first bore for passing air under pressure therethrough and a transverse bore communicating with said axial bore; a screw having a threaded shank seated in said transverse bore, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardly of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidly out of said passage and permits said stem to be rotated for engaging the stem shoulders under the opposing shoulders of the slot when the stem is released while air continues to pass rapidly through said opening and passage.

2. A valve assembly for a sphygmomanometer, comprising an elongated coupling having an axial first bore for passing air under pressure therethrough and a transverse bore communicating with said axial bore; a screw having a threaded shank seated in said transverse bore, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardy of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidy out of said passage and permits said stem to be rotated for engaging the stem shoulders under the opposing shoulders of the slot when the stem is released while air continues to pass rapidly through said opening and passage, said coupling having an axial tubular extension with another bore therein aligned with said first bore, a compressible bulb having one end engaged on said axial extension for passing air through said other bore and transverse bore to the first bore, and a one-way valve in said other bore comprising a flexible, cylindrical tube communicating at one end with said bulb and closed at the other end, said tube having lateral axially extending slots in opposite sides thereof for releasing air therethrough from the bulb into said other bore, and whereby said slots close and the opposite sides of the tube collapse to prevent passage of air in reverse direction from said other bore to the bulb, so that air under pressure can be released from the transverse bore only by inward movement of said stem.

3. A valve assembly for a sphygmomanometer, comprising an elongated coupling having an axial first bore for passing air under pressure therethrough and a transverse bore communicating with said axial bore; a screw having a threaded shank seated in said transverse bore, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardly of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidly out of said passage and permits said stem to be rotated for engaging the stem shoulders under the opposing shoulders of the slot when the stem is released while air continues to pass rapidly through said opening and passage, said coupling having an axial tubular extension with another bore therein aligned with said first bore, a compressible bulb having one end engaged on said axial extension for passing air through said other bore and transverse bore to the first bore, and a one-way valve in said other bore comprising a flexible, cylindrical tube communicating at one end with said bulb and closed at the other end, said tube having lateral axially extending slots in opposite sides thereof for releasing air therethrough from the bulb into said other bore, and whereby said slots closed and the opposite sides of the tube collapse to prevent passage of air in reverse direction from said other bore to the bulb, so that air under pressure can be released from the transverse bore only by inward movement of said stem, said coupling having another axial tubular extension, the first bore extending through said other tubular extension, a sleeve extending outwardly of said coupling and surrounding said other tubular extension, and means in said sleeve for engaging one end of a tubular fitting while said one end of the tubular fitting fits frictionally on said other axial tubular extension to pass air therethrough.

4. A valve assembly for a sphygmomanometer, comprising an elongated coupling having an axial first bore for passing air under pressure therethrough and a transverse bore communicating with said axial bore; a screw having a threaded shank seated in said transverse bore, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardly of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidly out of said passage and permits said stem to be rotated for engaging the stem shoulders under the opposing shoulders of the slot when the stem is released while air continues to pass rapidly through said opening and passage, said coupling having an axial tubular extension with another bore therein aligned with said first bore, a compressible bulb having one end engaged on said axial extension for passing air through said other bore and transverse bore to the first bore, and a one-way valve in said other bore comprising a flexible, cylindrical tube communicating at one end with said bulb and closed at the other end, said tube having lateral axially extending slots in opposite sides thereof for releasing air therethrough from the bulb into said other bore, and whereby said slots close and the opposite sides of the tube collapse to prevent passage of air in reverse direction from said other bore to the bulb, so that air under pressure can be released from the transverse bore only by inward movement of said stem, said coupling having another axial tubular extension, the first named bore extending through said other tubular extension, a sleeve extending outwardly of said coupling and surrounding said other tubular extension, a tubular fitting having one end thereof frictionally engaged on said other tubular extension, a flange on said one end of the tubular fitting, thread means in said sleeve detachably engaging said flange, and means on the other end of said fitting for receiving an end of an air conduction tube for passing air under pressure to and from the bores in said coupling, whereby detachment of said fitting from said coupling effects very rapid passage of air from said tube.

5. A valve assembly for a sphygmomanometer, comprising an elongated coupling having an axial first bore for passing air under pressure therethrough and a transverse bore communicating with said axial bore; a screw having a threaded shank seated in said transverse bore, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardly of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidly out of said passage and permits said stem to be rotated for engaging the stem shoulders under the opposing shoulders of the slot when the stem is released while air continues to pass rapidly through said opening and passage, said coupling having an axial tubular extension, the first bore extending through said tubular extension, a sleeve extending outwardly of said coupling and surrounding said tubular extension, and means in said sleeve for engaging one end of a tubular fitting while said one end of the tubular fitting fits frictionally on said tubular extension to pass air therethrough.

6. A valve assembly for a sphygmomanometer, comprising an elongated coupling having an axial first bore for passing air under pressure therethrough and a transverse bore communicating with said axial bore; a screw having a threaded shank seated in said transverse bore, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardly of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidly out of said passage and permits said stem to be rotated for engaging the stem shoulders under the opposing shoulders of the slot when the stem is released while air continues to pass rapidly through said opening and passage, said coupling having an axial tubular extension, the first bore extending through said tubular extension, a sleeve extending outwardly of said coupling and surrounding said tubular extension, a tubular fitting having one end thereof frictionally engaged on said tubular extension, a flange on said one end of the tubular fitting, thread means in said sleeve detachably engaging said flange, and means on the other end of said fitting for receiving an end of an air conduction tube for passing air under pressure to and from the bores in said coupling, whereby detachment of said fitting from said coupling effects very rapid passage of air from said tube.

7. A valve assembly for a sphygmomanometer, comprising a screw having a threaded shank, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardly of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidly out of said passage and permits said stem to be rotated for engaging the stem shoulders under the opposing shoulders of the slot when the stem is released while air continues to pass rapidly through said opening and passage.

8. A valve assembly for a sphygmomanometer as defined in claim 2 wherein the flexible, cylindrical tube in said other bore is formed with an integral closure at one end and is formed integrally with a plug in the said other bore in the extension.

9. A valve assembly for a sphygmomanometer, comprising an elongated coupling having an axial first bore for passing air under pressure therethrough and a transverse bore communicating with said axial bore; a screw having a threaded shank seated in said transverse bore, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardly of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidly out of said passage and permits said stem to be rotated for engaging the stem shoulders under the opposing shoulders of the slot when the stem is released while air continues to pass rapidly through said opening and passage, said coupling having an axial tubular extension with another bore therein aligned with said first bore, a compressible bulb having one end engaged on said axial extension for passing air through said other bore and transverse bore to the first bore, and a one-way valve in said other bore comprising a rigid tube communicating at one end with said bulb, the other end of said tube being closed, said rigid tube having holes in opposite sides thereof, a rubber sleeve around said rigid tube covering said holes, said sleeve adapted to be forced off of the rigid tube by forced air through said holes to permit release of air from the bulb into said other bore, and prevent passage of air in reverse direction from said other bore to the bulb so that air under pressure can be released from the transverse bore only by inward movement of the stem.

10. A valve assembly for sphygmomanometer, comprising an elongated coupling having an axial first bore for passing air under pressure therethrough and a transverse bore communicating with said axial bore; a screw having a threaded shank seated in said transverse bore, said shank having an axial passage, said screw having a head at one end of the shank with a diametral slot in said head, said passage communicating with said slot, opposite edges of said slot being undercut to define two opposing shoulders overhanging one end of said passage at said slot, a valve stem axially movable in said passage and extending through said slot, said stem having a cylindrical body in said passage, a pair of flat, parallel, recessed lands at one end of said body, and a cylindrical neck extending axially outwardly of said end of the body to define stem shoulders thereat, said stem having an annular flange at the other end of said body, and a coil spring axially aligned with said body and bearing on said flange for effecting an airtight seal between said flange and the other end of said shank, whereby slight axial movement of said stem inwardly of said transverse bore opens said seal to release air slowly through said passage and past said lands at the opposing shoulders of said slot, and whereby further axial movement of said stem inwardly of said transverse bore to dispose said neck at the opposing shoulders of the slot provides an annular opening for passing air rapidly out of said passage and permits said stem to be rotated for engaging the stem shoulders under the opposing shoulders of the slot when the stem is released while air continues to pass rapidly through said opening and passage, said coupling having an axial tubular extension with another bore therein aligned with said first bore, a compressible bulb having one end engaged on said axial extension for passing air through said other bore and transverse bore to the first bore, and a one-way valve in said other bore comprising a rigid tube communicating at one end with said bulb, the other end of said tube being closed, said rigid tube having holes in opposite sides thereof, an elongated rubber sleeve around said rigid tube covering said holes, said sleeve adapted to be forced off of the rigid tube by forced air through said holes to permit release of air from the bulb into said other bore, and prevent passage of air in reverse direction from said other bore to the bulb so that air under pressure can be released from the transverse bore only by inward movement of the stem, a threaded screw ring integral with said one end of the rigid tube, said ring having an annular recess around the bore thereof at the outer face thereof, and a perforated frame disc in said annular recess and an annular integral flange around the closed end of the rigid tube for preventing longitudinal displacement of the rubber sleeve.

References Cited by the Examiner
UNITED STATES PATENTS

| | | | |
|---|---|---|---|
| 906,217 | 12/1908 | Gaylord | 285—376 |
| 1,051,805 | 1/1913 | Danberg | 285—376 |
| 2,603,210 | 7/1952 | Puig | 73—402 |
| 2,934,061 | 4/1960 | Speelman | 128—2.05 |

M. CARY NELSON, *Primary Examiner.*

W. CLINE, *Assistant Examiner.*